(12) United States Patent
Ananth et al.

(10) Patent No.: US 10,897,716 B1
(45) Date of Patent: Jan. 19, 2021

(54) INTEGRATED ACCESS AND BACKHAUL FROM HIGH ALTITUDE PLATFORMS

(71) Applicant: LOON LLC, Mountain View, CA (US)

(72) Inventors: Sharath Ananth, Cupertino, CA (US); Brian Barritt, San Jose, CA (US)

(73) Assignee: LOON LLC, Mountain View, CA (US)

( * ) Notice: Subject to any disclaimer, the term of this patent is extended or adjusted under 35 U.S.C. 154(b) by 0 days.

(21) Appl. No.: 16/565,087

(22) Filed: Sep. 9, 2019

(51) Int. Cl.
| | |
|---|---|
| *H04W 4/00* | (2018.01) |
| *H04W 16/26* | (2009.01) |
| *H04B 7/185* | (2006.01) |
| *H04W 64/00* | (2009.01) |

(52) U.S. Cl.
CPC ............ *H04W 16/26* (2013.01); *H04B 7/185* (2013.01); *H04B 7/1851* (2013.01); *H04B 7/18504* (2013.01); *H04B 7/18513* (2013.01); *H04B 7/18563* (2013.01); *H04W 64/003* (2013.01)

(58) Field of Classification Search
CPC ............ H04B 7/18513; H04B 7/18504; H04B 7/18521; H04B 7/18515; H04B 7/1851; H04B 7/19; H04B 10/118; H04B 7/18508; H04B 7/18517; H04B 7/2041; H04W 84/06; H04W 72/046; H04W 16/28; H04W 40/20; H04W 64/003
See application file for complete search history.

(56) References Cited

U.S. PATENT DOCUMENTS

| | | | |
|---|---|---|---|
| 9,622,277 B1* | 4/2017 | Sun ..................... | H04W 40/20 |
| 10,206,232 B2 | 2/2019 | Novlan et al. | |
| 2001/0039189 A1* | 11/2001 | Cox .................... | H04B 7/18504 455/431 |
| 2015/0162975 A1* | 6/2015 | Jalali .................. | H04B 7/18513 455/12.1 |
| 2018/0227043 A1* | 8/2018 | Dankberg .......... | H04B 7/18515 |
| 2018/0316429 A1* | 11/2018 | Barritt ............... | H04B 10/1129 |
| 2019/0045580 A1* | 2/2019 | Chai .................... | H04W 92/02 |
| 2019/0104132 A1* | 4/2019 | Cooper ................ | H04L 63/107 |
| 2019/0260463 A1* | 8/2019 | Gopal ................. | H04B 7/18513 |
| 2019/0326983 A1* | 10/2019 | Wang .................. | H04W 72/04 |

OTHER PUBLICATIONS

Bertenyi, et al., NG Radio Access Network, Journal of ICT, vol. 6_1 & 2, 59-76. River Publishers dated 2018.
Polese, et al., Integrated Access and Backhaul in 5G mmWave Networks: Potentials and Challenges, arXiv:1906.01099v1 [cs.NI] Jun. 3, 2019.

* cited by examiner

*Primary Examiner* — Khalid W Shaheed
(74) *Attorney, Agent, or Firm* — Botos Churchill IP Law LLP

(57) ABSTRACT

A method is for establishing one or more links for an integrated access and backhaul for millimeter wave network. The network includes a high-altitude platform (HAP) as a first node and a terrestrial node as a second node. The method includes obtaining location information of the HAP in the network, determining that the HAP can be used to provide an additional access link or an additional backhaul link in the network in connection with the terrestrial node, controlling one or more transceivers of the terrestrial node to point towards the HAP according to the location information, and establishing the additional access link or the additional backhaul link between the HAP and the terrestrial node.

24 Claims, 7 Drawing Sheets

600

700

INTEGRATED ACCESS AND BACKHAUL FROM HIGH ALTITUDE PLATFORMS

BACKGROUND

Information can be transmitted over directional point-to-point networks or point-to-multipoint networks, such as aerospace and other mobile networks. In such networks, links can be formed between pairs of nodes by aiming transceivers of each node pair towards each other. Links can also be formed by steering the transceivers of a network node either toward a discrete user terminal or node or toward some discrete point to cover a general geographic area. In some implementations, nodes may include non-geostationary satellite orbit (NGSO) satellites or other high-altitude platforms (HAPs) that are in motion relative to the Earth.

BRIEF SUMMARY

The technology described herein provides for establishing an access or backhaul link using high-altitude platforms as network nodes between user equipment or terrestrial nodes when more density of nodes is required. The access and backhaul links established may be used for an integrated access and backhaul for millimeter wave network or other short-range communications networks.

Aspects of the disclosure provide for a method of establishing one or more links for an integrated access and backhaul for a network. The network includes a high-altitude platform (HAP) as a first node and a terrestrial node as a second node. The method includes obtaining physical location information of the HAP in the network; determining that the HAP can be used to provide an additional access link or an additional backhaul link in the network in connection with the terrestrial node; in response to the determining that the HAP can be used to provide the additional access link or the additional backhaul link, controlling, by one or more processors, one or more transceivers of the terrestrial node to point towards the HAP according to the physical location information; and establishing, by the one or more processors, the additional access link or the additional backhaul link between the HAP and the terrestrial node.

In one example, the physical location information of the HAP includes coordinates of a location of the HAP. In another example, determining that the HAP can be used to provide the additional access link or the additional backhaul link includes determining that the HAP is in signal range of the terrestrial node. Optionally in this example, determining that the HAP can be used to provide the additional access link further includes determining that the HAP is also in range of a geographic location that has an amount of coverage by the network that is lower than a threshold amount of coverage. Also optionally in this example, determining that the HAP can be used to provide the additional access link further includes determining that the HAP is also in signal range of another terrestrial node in the network.

In a further example, controlling the one or more transceivers of the terrestrial node to point towards the HAP includes pointing the one or more transceivers above a horizon to a location of the HAP. In yet another example, establishing the additional access link includes implementing a 5G New Radio (NR) protocol associated with a user plane layer at the HAP and the terrestrial node. In a still further example, establishing the additional backhaul link includes implementing a 5G New Radio (NR) protocol associated with a control plane layer at the HAP and the terrestrial node. In another example, determining that the HAP can be used to provide the additional access link or the additional backhaul link in the network in connection with the terrestrial node includes using software-defined networking to determine an overall network configuration for the network that includes the additional access link or the additional backhaul link.

Other aspects of the disclosure provide for a system. The system includes one or more transceivers of a terrestrial node configured to establish one or more links with a remote node for an integrated access and backhaul; and one or more processors. The one or more processors are configured to receive a message to establish an additional access link or an additional backhaul link with a high altitude platform (HAP), the message including physical location information of the HAP; control the one or more transceivers of the terrestrial node to point towards the HAP according to the physical location information; and establish the additional access link or the additional backhaul link between the HAP and the terrestrial node.

In one example, the physical location information of the HAP includes coordinates of a location of the HAP. In another example, controlling the one or more transceivers of the terrestrial node to point towards the HAP includes pointing the one or more transceivers above a horizon to a location of the HAP. In a further example, establishing the additional access link includes implementing a 5G New Radio (NR) protocol associated with a user plane layer at the HAP and the terrestrial node. In yet another example, establishing the additional backhaul link includes implementing a 5G New Radio (NR) protocol associated with a control plane layer at the HAP and the terrestrial node.

Further aspects of the disclosure provide for a non-transitory, computer-readable medium. The medium includes instructions that, when executed by one or more processors, cause the one or more processors to perform a method. The method includes obtaining physical location information of a high-altitude platform (HAP) in a network; determining that the HAP can be used to provide an additional access link or an additional backhaul link in the network in connection with a terrestrial node of the network; in response to the determining that the HAP can be used to provide the additional access link or the additional backhaul link, causing one or more transceivers of the terrestrial node to point towards the HAP according to the physical location information; and causing the additional access link or the additional backhaul link to be established between the HAP and the terrestrial node.

In one example, the physical location information of the HAP includes coordinates of a location of the HAP. In another example, determining that the HAP can be used to provide the additional access link or the additional backhaul link includes determining that the HAP is in signal range of the terrestrial node. Optionally in this example, determining that the HAP can be used to provide the additional access link further includes determining that the HAP is also in range of a geographic location that has an amount of coverage by the network that is lower than a threshold amount of coverage. Also optionally in this example, determining that the HAP can be used to provide the additional access link further includes determining that the HAP is also in signal range of another terrestrial node in the network. In a further example, determining that the HAP can be used to provide the additional access link or the additional backhaul link in the network in connection with the terrestrial node includes using software-defined networking to determine an overall network configuration for the network that includes the additional access link or the additional backhaul link.

DETAILED DESCRIPTION

Overview

The technology relates to implementing integrated access and backhaul (IAB) for millimeter wave or other short-range communications signals using high-altitude platforms (HAPs). As the range for radio frequencies reach millimeter wave (mmWave) ranges or greater, higher atmospheric attenuation and greater atmospheric absorption occurs. These higher frequency wavelengths have a shorter effective range that lower frequency wavelengths as a result, and may require a greater density of network nodes to provide coverage and backhaul to a geographic area. In addition, blockages to these higher frequencies may occur more frequently due to buildings, trees, and other obstacles. Typically, these higher frequencies have more bandwidth available for use as compared to lower frequency bands. These higher frequency bands are thus more useful in transmitting larger amounts of data.

HAPs, such as balloons that are able to be positioned above obstacles and in the line-of-sight of access nodes, may offer a means for avoiding obstacles to more successfully provide access links, backhaul links, or implement IAB services. In particular, a given HAP may communicate with a given terrestrial network node to provide access to users in a geographic area or backhaul to a network. The given terrestrial network node may include one or more antennas that are capable of pointing above the horizon. The given terrestrial network node may use the one or more antennas to scan the horizon when the given HAP is within a vicinity of the given terrestrial network node. When a connection with the given HAP is obtained, the given terrestrial network may establish an access link and/or a backhaul link with the given HAP.

The features described herein provide for a network that is able to adapt to coverage and backhaul needs in an efficient manner. The incorporation of HAPs to provide additional access links and backhaul links may increase the capacity and coverage of the network that may otherwise be limited by the shorter range of higher frequency communication signals. The network may as a result provide more reliable service and better coverage to user equipment.

Example Systems

Figure 1:
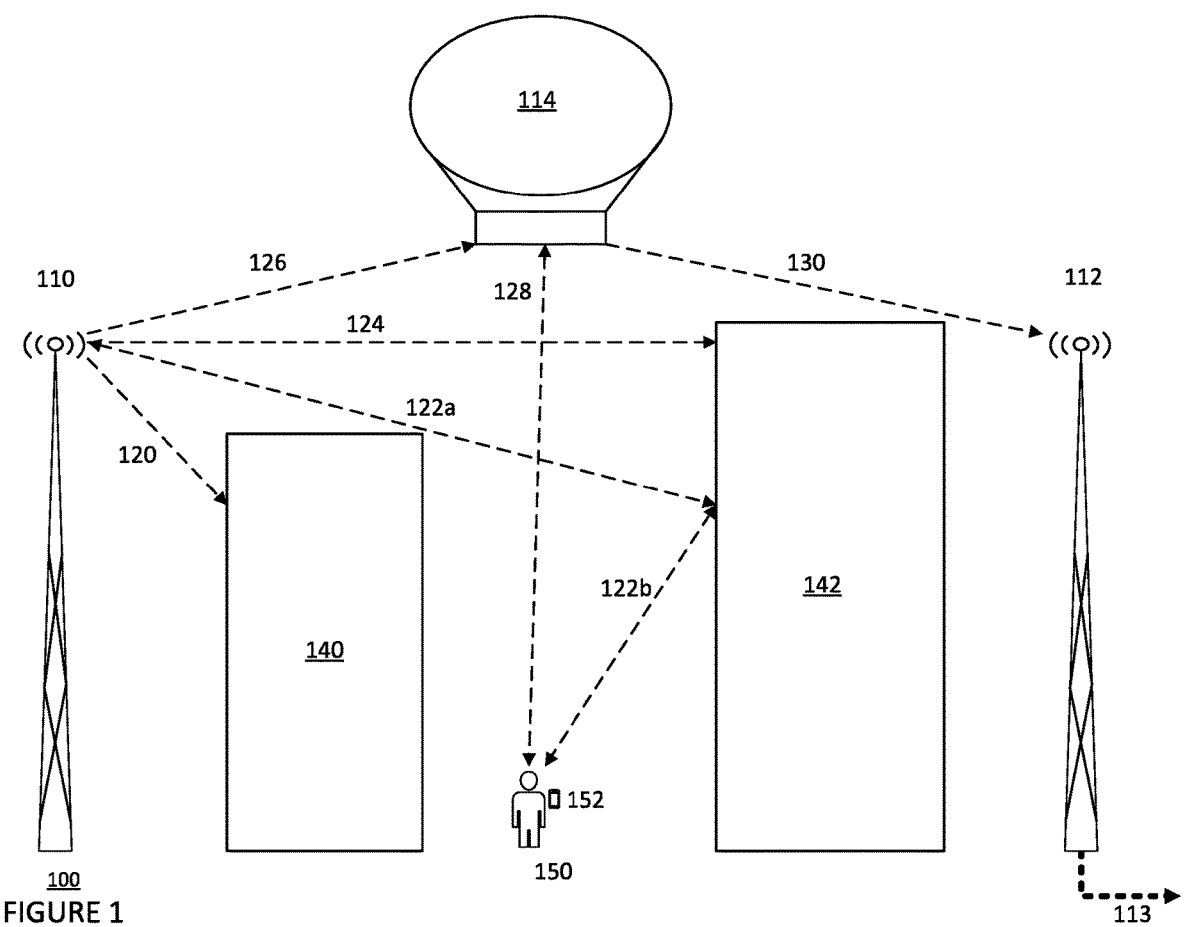
FIG. 1 is a pictorial diagram of a portion of an example network in accordance with aspects of the disclosure.

FIG. 1 is a pictorial diagram of an example system 100 of network nodes in a network. The network may include nodes mounted on various land- and air-based devices, some of which may change position with respect to other nodes in the network over time. For example, as shown in FIG. 1, the network includes, as nodes, a first terrestrial tower 110 and a second terrestrial tower 112. The network also includes as a node a high-altitude platform 114. As shown, HAP 114 is a balloon. In other embodiments, the HAP may be a blimp, an airplane, an unmanned aerial vehicle (UAV) such as a drone, a satellite, or another platform capable of low Earth orbit.

Nodes in the network may be equipped to transmit and receive mmWave signals or other very high frequency signals. Additionally or alternatively, nodes in the network may be equipped to transmit and receive other radio-frequency signals, optical signals, or other communication signal capable of travelling through free space. Arrows shown projecting from nodes represent possible paths 120, 122a, 122b, 124, 126, 128, 130 for a transmitted communication signal. As shown in FIG. 1, some possible paths may be blocked by buildings, such as buildings 140, 142. For example, a signal following path 120 from node 110 may be angled below the horizon and be blocked by building 140. A signal following path 122a from node 110 may be angled above path 120, avoiding building 140, but then may contact building 142. The signal following path 122a may reflect off building 142 and follow path 122b towards the ground location of a user 150, carrying a client device 152. A signal following path 124 from node 110 may be angled towards or above the horizon, nearly parallel to the ground, passing over building 140, but then may be blocked by building 142. A signal following path 126 from node 110 may be angled above the horizon and reach node 114. A signal following path 128 from node 114 directed to the ground location of user 150. A signal following path 130 from node 114 may be angled below the horizon, pass over building 142, and reach node 112.

Also shown in FIG. 1, a signal may be transmitted from the client device 152 of the user 150 back towards one or more nodes of the network. For example, a signal from the client device 152 may be transmitted back along paths 122b and 122a towards node 110. Another signal from the client device 152 may be transmitted back along path 128 towards node 114. In addition, multiple users or multiple client devices may form bi-directional access links with a given node of the network at a given point in time, in addition to the user 150 and the client device 152 shown in FIG. 1.

The network nodes as shown in FIG. 1 is illustrative only, and the network may include additional or different nodes. For example, in some implementations, the network may include additional HAPs and/or additional terrestrial towers. When the network includes at least one low Earth orbit or high Earth orbit satellite as well as one other type of HAP, the network may be defined as a hybrid HAP/satellite network.

In some implementations, the network may serve as an access network for client devices such as cellular phones, laptop computers, desktop computers, wearable devices, or tablet computers. For example, nodes 110, 112, 114 may connect to the datacenters via wireless, fiber, or cable backbone network links or transit networks operated by third parties. The nodes 110, 112, 114 may provide wireless access for the users, and may forward user requests to the datacenters and return responses to the users via the backbone network links.

In particular, the first terrestrial tower 110, the second terrestrial tower 112, and the HAP 114 may include wireless transceivers configured to operate in a cellular or other mobile network, such as 5G NR (new radio) networks or LTE networks. The nodes 110, 112, 114 may operate as gNodeB stations, eNodeB stations, or other wireless access points, such as WiMAX or UMTS access points. One or more terrestrial towers in the network may include an optical fiber or other link connecting the one or more terrestrial towers to another terrestrial tower or datacenter. For example, the second terrestrial tower 112 may include fiber 113, shown by a dotted arrow, that connects to another terrestrial tower (not shown). As shown in FIG. 1, user 150 carrying a client device 152 may be configured to communicate with one or more of the nodes in the network. The network also may be connected to a larger network, such as the Internet, and may be configured to provide a client device with access to resources stored on or provided through the larger computer network.

Figure 2:
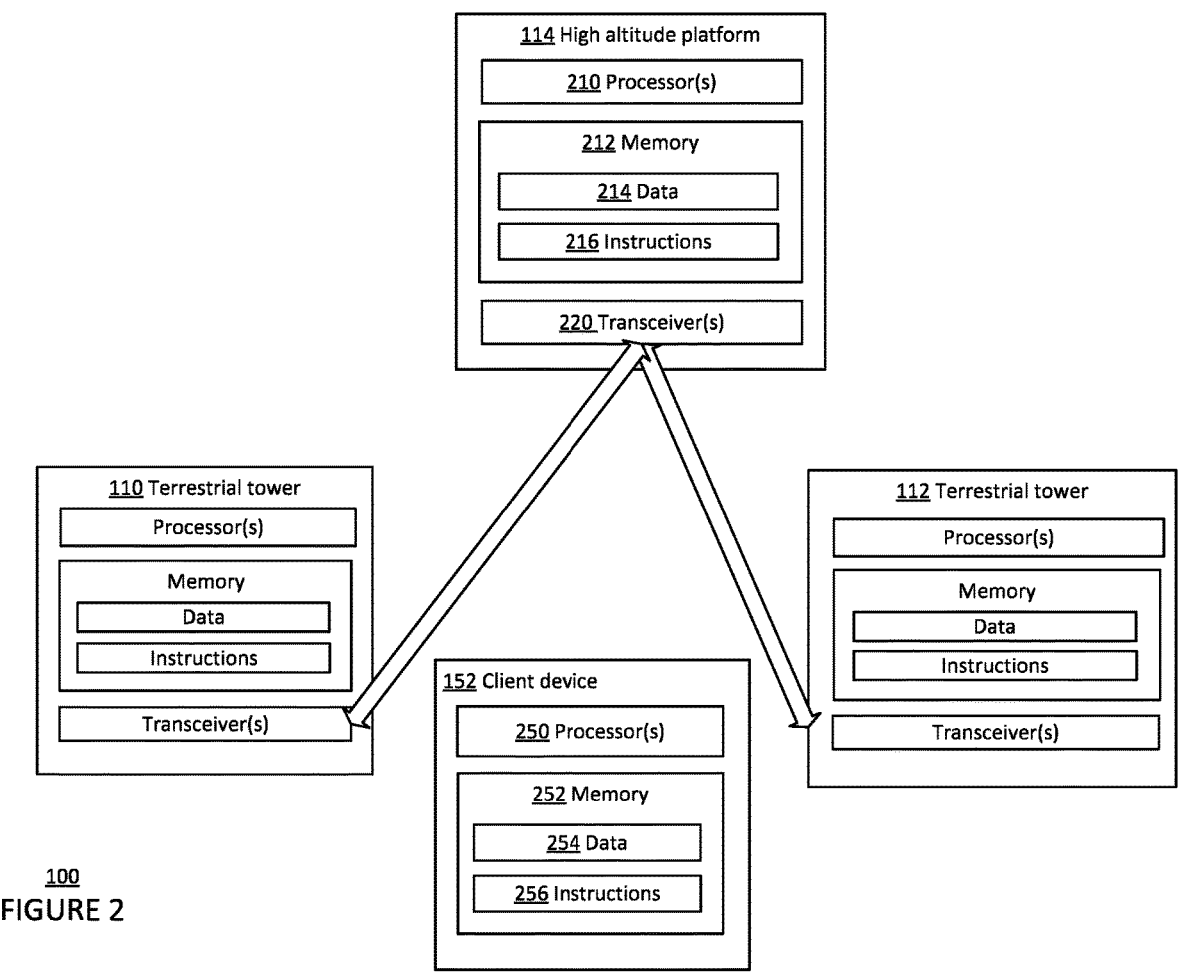
FIG. 2 is a functional diagram of the portion of the network shown in FIG. 1 in accordance with aspects of the disclosure.

As shown in FIG. 2, each node, such as first terrestrial tower 110, second terrestrial tower 112, and HAP 114, may include one or more transceivers configured to transmit and receive communication signals and create one or more communication links with another node in the network. Referring to HAP 114 as an example, each of the nodes, may include one or more processors 210, memory 212, and one or more transceivers 220. While only terrestrial towers 110, 112 and HAP 114 are shown, other terrestrial towers and HAPs in the network may have the same or as similar configurations.

The one or more processors 210 may be any conventional processors, such as commercially available CPUs. Alternatively, the one or more processors may be a dedicated device such as an application specific integrated circuit (ASIC) or other hardware-based processor, such as a field programmable gate array (FPGA). The one or more processors 210 may be configured to operate according to a given protocol architecture for a mobile network, such as 5G NR architecture or LTE radio protocol architecture. Although FIG. 2 functionally illustrates the one or more processors 210 and memory 212 as being within the same block, it will be understood that the one or more processors 210 and memory 212 may actually comprise multiple processors and memories that may or may not be stored within the same physical housing. Accordingly, references to a processor or computer will be understood to include references to a collection of processors or computers or memories that may or may not operate in parallel.

Memory 212 stores information accessible by the one or more processors 210, including data 214, and instructions 216, that may be executed by the one or more processors 210. The memory may be of any type capable of storing information accessible by the processor, including non-transitory and tangible computer-readable mediums containing computer readable instructions such as a hard-drive, memory card, ROM, RAM, DVD or other optical disks, as well as other write-capable and read-only memories. The system and method may include different combinations of the foregoing, whereby different portions of the data 214 and instructions 216 are stored on different types of media. In the memory of each node, such as memory 212 of HAP 110*a*, a forwarding information base or forwarding table may be stored that indicate how signals received at each node should be forwarded, or transmitted. For example, the forwarding table stored in memory 212 may indicate that a signal received from ground station 107*a* should be forwarded to HAP 110*d*.

Data 214 may be retrieved, stored or modified by the one or more processors 210 in accordance with the instructions 216. For instance, although the system and method are not limited by any particular data structure, the data 214 may be stored in computer registers, in a relational database as a table having a plurality of different fields and records, XML documents or flat files. The data 214 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 214 may comprise any information sufficient to identify the relevant information, such as numbers, descriptive text, proprietary codes, references to data stored in other areas of the same memory or different memories (including other network locations) or information that is used by a function to calculate the relevant data.

The instructions 216 may be any set of instructions to be executed directly (such as machine code) or indirectly (such as scripts) by the one or more processors 210. For example, the instructions 216 may include the given protocol architecture for the mobile network of which the node is a part. The given protocol architecture may include a split architecture between a central unit and a distributed unit. In addition, the given protocol architecture may define a control plane, a user plane, or other protocol layers. The given protocol architecture may also include an interface that defines a plurality of messages for use in communication between the protocol layers. The instructions 216 may be stored as computer code on the computer-readable medium. In that regard, the terms "instructions" and "programs" may be used interchangeably herein. The instructions 216 may be stored in object code format for direct processing by the one or more processors 210, or in any other computer language including scripts or collections of independent source code modules that are interpreted on demand or compiled in advance. Functions, methods and routines of the instructions 216 are explained in more detail below.

The one or more transceivers 220 may include at least one wireless transceiver mounted to actuators that can be controlled, or steered, to point in a desired direction. To form a wireless link between two nodes, such as the node associated with the HAP 114 and the node associated with the first terrestrial tower 110, the wireless transceivers of the respective nodes can be controlled to point in the direction of one another so that data can be sent and received between the nodes. For nodes with fiber or cable connections, such as second terrestrial tower 112, the one or more transceivers 220 may also include at least one transceiver configured to communicate via a fiber or cable connection.

As further shown in FIG. 2, the client device 152 associated with user 150 may be a personal computing device or a server with one or more processors 250, memory 252, data 254, and instructions 256 similar to those described above with respect to the one or more processors 210, memory 212, data 214, and instructions 216. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client device 152 may be any device capable of processing instructions and transmitting data to and from humans and other computers including general purpose computers, network computers lacking local storage capability, and set-top boxes for televisions. In some embodiments, client devices may be associated with one or more SDN applications and may have one or more northbound interface (NBI) drivers.

Figure 3:
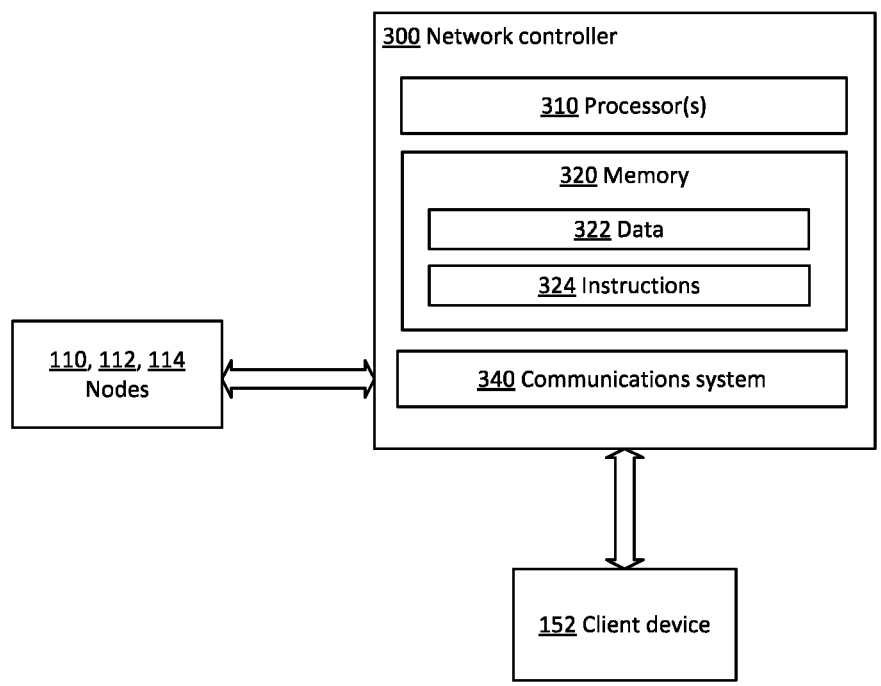
FIG. 3 is a functional diagram of a network controller in accordance with aspects of the disclosure.

In some implementations, the network can be an SDN that is controlled by an SDN controller, such as network controller 300 depicted in FIG. 3. The network controller 300 may be located at one of the network nodes or at a separate platform, such as, for example, in a datacenter. The nodes of the network, including nodes 110, 112, 114 may be configured to communicate with one another using the steerable transceivers, such as the one or more transceivers 220. As the HAPs in the network, such as HAP 114, move with respect to other nodes in the network, such as terrestrial towers 110, 112, some network links may become infeasible due to range of the transceivers or obstacles between the nodes. Thus, the configuration of the network may require regular (i.e., periodic) or irregular reconfiguration using the network controller 300 to maintain connectivity and to satisfy determined network flows.

FIG. 3 is a block diagram of network controller 300. The network controller 300 may be configured to send control messages to the nodes of the network to provide reconfiguration according to updated topology, to pass routing information, and to schedule reconfigurations to transmit client data. As shown in FIG. 3, the network controller 300 may include one or more processors 310, memory, 320, and communications system 340. The one or more processors 310 may be similar to the one or more processors 210 described above. Memory 320 may store information accessible by the one or more processors 310, including data 322 and instructions 324 that may be executed by processor 310. Memory 320, data 322, and instructions 324 may be configured similarly to memory 212, data 214, and instructions 216 described above. The data 322 may include a table representing all of the available nodes and possible links in the network 100 at a given time or time frame. The instructions 324 may include one or more modules for managing topology and routing, determining topology, determining network flows, solving for network configurations, controlling flight of a given HAP, or scheduling future network configurations.

The communications system 340 may be configured to communicate with the nodes of network, such as nodes 110, 112, 114, as well as one or more client devices, such as client device 152. In some embodiments, the communication system 340 includes a Control to Data-Plane Interface (CDPI) driver configured to communicate with a CDPI agent at each of the nodes 107, 110. In addition, the communications system 340 of the network controller 300 may include one or more NBI agents configured to communicate with an NBI driver at each client device associated with one or more SDN applications. The communication system 340 may optionally or alternatively be configured to transmit and receive a signal via radio frequencies, optical frequencies, optical fiber, cable, or other communication means to and from the nodes in the network and the one or more client devices.

Example Methods

In addition to the operations described above and illustrated in the figures, various operations will now be described. It should be understood that the following operations do not have to be performed in the precise order described below. Rather, various operations can be handled in a different order or simultaneously, and operations may also be added or omitted.

Figure 4:
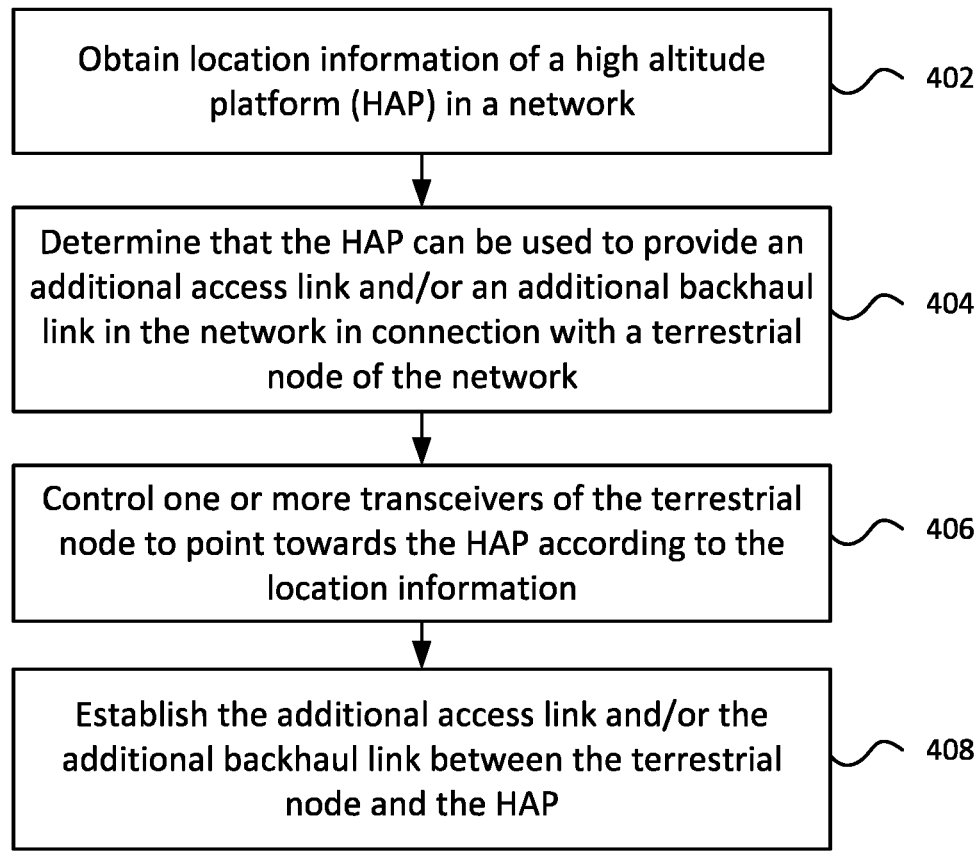
FIG. 4 is a flow diagram of a method in accordance with aspects of the disclosure.

In FIG. 4, flow diagram 400 is shown in accordance with some of the aspects described above that may be performed by one or more processors of nodes of a network, such as that of nodes 110, 112, 114. While FIG. 4 shows blocks in a particular order, the order may be varied and that multiple operations may be performed simultaneously. Also, operations may be added or omitted.

At block 402, location information of a HAP of the network may be obtained. Obtaining the location information may include using the one or more processors of a HAP to transmit its location information to a central server or datacenter in the network, to the network controller of the network, or to the terrestrial node via a path through the network. The transmission of location information to the terrestrial node through the network may be via a message from the central server or datacenter of from the network controller. In some other cases, transmission of the location information may be a broadcast from the HAP. In some cases, the location information may be transmitted directly to the terrestrial node from the HAP.

The location information may include coordinates or relative position to other nodes in the network. The location information may also include a projected trajectory of the HAP over time. Transmission of the location information may be performed using optical communication, radiofrequency communication, or other communication means. In some implementations, the communication means for transmitting the location information may have a greater range than mmWave signals. In addition, transmission of the location information may be continuous or at regular or irregular intervals.

The one or more processors 210 of HAP 114 may transmit its coordinates to a central server of the network. The central server may transmit a message including the coordinates of the HAP 114 to the terrestrial tower 110. The coordinates may be updated at regular intervals, such as every second. At the same time or at a later time, the central server may transmit a message including the coordinates of the HAP 114 to the terrestrial tower 112.

When the location of the terrestrial node is known, such as when the locations of terrestrial nodes are stored on a memory that is accessible locally or remotely, the transmission of the location information to the terrestrial node may be initiated when the location of the HAP is within a particular distance from the location of the terrestrial node or is projected to be within the particular distance within a set amount of time. The set amount of time may be, for example, 5 minutes, or more or less. In other implementations, the locations of terrestrial nodes may be detected by scanning using the network or the HAP, rather than being pre-stored in a memory.

The particular distance may be a predicted effective range of signals transmitted from the terrestrial node. The signals transmitted from the terrestrial node may be mmWave signals, another type of communication signal, or a combination of signal bands. The predicted effective range of signals may be determined based on a frequency of the signals, a condition of one or more systems of the terrestrial node, and/or weather conditions. Therefore, when the HAP is within the predicted effective range of communications of a given terrestrial node, the one or more processors of the central server, the network controller, or the HAP may transmit the location information to the given terrestrial node. In addition to the location information, an estimated amount of time the HAP will be in range of the given terrestrial node, a predicted future location of the HAP, an estimated amount of time the HAP will be in a given location, an estimated amount of time location information is valid, type information, band capability of the HAP, band availability of the HAP, or other data related to the HAP may be transmitted.

The one or more processors 210 of HAP 114 may detect that the HAP 114 is projected to be within the signal range of the first terrestrial tower 110 in 5 minutes and transmit its coordinates directly to the first terrestrial tower 110 using radiofrequency signals. The coordinates may be updated at regular intervals, such as every second. At the same time or at a later time, the one or more processors 210 of HAP 114 may detect that HAP 114 is projected to be within the signal range of the second terrestrial tower 112 and transmit its coordinates directly to the second terrestrial tower 112 using radiofrequency signals.

At block 404, one or more processors may determine that the HAP can be used to provide an additional access link and/or an additional backhaul link in the network in connection with a terrestrial node of the network based on the location information of the HAP. Namely, the one or more processors of the terrestrial node that receives the location information may determine that the HAP is or will be in a range of the terrestrial node, such as in range of signals of the terrestrial node. Additional data related to the HAP, such as the estimated amount of time the HAP will be in range of the given terrestrial node, the predicted future location of the HAP, the estimated amount of time the HAP will be in a given location, the estimated amount of time location information is valid, type information, band capability of the HAP, or band availability of the HAP, may be used to determine that the HAP can be used to provide the additional access link and/or backhaul link.

For example, the one or more processors may further determine that the HAP can be used to provide the additional access link and/or the additional backhaul link during a particular period of time based on the estimated amount of time the HAP will be in range of the give terrestrial node, the predicted further location of the HAP, the estimated amount of time the HAP will be in the given location, and/or the estimated amount of time location information is valid. Based on the type information and/or the band capability of the HAP, the one or more processors may further determine that the HAP can be used to provide the additional access link and/or the additional backhaul link using a set of link characteristics, including, such as a type of communication or a frequency. In multi-band capable HAP, the one or more processors may further determine that a first frequency band of the HAP is being utilized for a transfer of data or has heavy loading from other uses and that a second frequency band of the HAP is unused or has available bandwidth based on the band capability of the HAP and/or the band availability of the HAP. The one or more processors may determine that the second frequency band of the HAP can be used to provide the additional access link and/or the additional backhaul link in the network.

In addition, the HAP may be used to provide an additional access link when the current location of the HAP or projected location from the trajectory of the HAP provides coverage to a geographic location that has an amount of coverage by the network that is lower than a threshold amount of coverage. For example, a first geographic location may have no mmWave coverage, no 3.5 GHz 5G coverage, or no 2.6 GHz 5G coverage. The current location of the HAP may allow the HAP to form a link with a terrestrial node in a second geographic location having mmWave coverage, 3.5 GHz 5G coverage, or 2.6 GHz 5G coverage and also allow the HAP to form a link with a client device in the first geographic location. Alternatively, the location of the HAP may allow the HAP to connect the client device in the first geographic location to an overall network that provides 5G coverage. The HAP may also be assigned by the one or more processors of the terrestrial node to provide an additional access link to the geographic location based on an overall network configuration. In another example, the assignment may be determined based on a received request for coverage in the geographic location.

The HAP may be used to provide an additional backhaul link when the current location of the HAP or projected location from the trajectory of the HAP is in signal range of another node of the network. The additional backhaul link may also be provided based on an amount of congestion on a backhaul link of a given terrestrial node. In some implementations, the one or more processors of the given terrestrial node, such as a central unit, may determine a routing for the additional backhaul link based on the location information of the HAP and the amount of congestion on the existing backhaul link. The location information may include an amount of time that the HAP will be in a location making the additional backhaul link available to the given terrestrial node. The determined routing for the additional backhaul link may include an amount of data to send via the additional backhaul link.

Additionally or alternatively, determining that the HAP may be used to provide the additional access link and/or the additional backhaul link in the network may include determining a set location for the HAP to travel to in order to establish the additional access link and/or the additional backhaul link.

As shown in FIG. 1, HAP 114 may be in a location that is in range of signals of terrestrial tower 110 and terrestrial tower 112, as shown by paths 126 and 130. The one or more processors of the terrestrial tower 110 may receive the location of the HAP 114 and determine that HAP 114 is in range of the signals of the terrestrial tower 110. In addition, the one or more processors of the terrestrial tower 110 may determine that HAP 114 can provide additional coverage to a geographic area between buildings 140, 142. The one or more processors of terrestrial tower 110 may also determine that HAP 114 can provide a link to terrestrial tower 112 in the received location. The path 124 directly from terrestrial tower 110 to terrestrial tower 112 may be blocked by building 142. At the same time, the path 126 between terrestrial tower 110 to HAP 114 at the received location may be available and the path 130 between HAP 114 and terrestrial tower 112 may be available.

At block 406, when the HAP 114 can be used for an additional access link and/or an additional backhaul link, the one or more transceivers of the terrestrial node may be controlled to transmit signals toward the HAP 114 according to the location information. In particular, the one or more processors of the terrestrial node may control the one or more transceivers to transmit signals toward to the HAP 114. Given the height at which HAPs are flown (or their float height), the one or more processors may control the one or more transceivers to transmit signals above the horizon toward the HAP 114. The one or more transceivers may be controlled to scan an area starting at the received location of the HAP 114. The scan may be in a search pattern to acquire a link. For example, the one or more processors of the terrestrial tower 110 may control the one or more transceivers of the terrestrial tower 110 to transmit signals toward the HAP 114. The one or more transceivers of the terrestrial tower 110 may be controlled in a search pattern until a link with the HAP 114 is acquired.

At block 408, the additional access link and/or the additional backhaul link may be established between the terrestrial node and the HAP. For example, the one or more processors of the terrestrial tower 110 may establish the additional access link or the additional backhaul link with HAP 114. Establishing the additional access link may include sending instructions from the one or more processors of the terrestrial node to the HAP to cause the one or more processors of the HAP to implement a protocol associated with the user plane layer. Establishing the additional backhaul link may include sending instructions from the one or more processors of the terrestrial node to the HAP to cause the one or more processors of the HAP to implement a protocol associated with the control plane layer. Establishing the additional backhaul link may also include sending instructions to the HAP to cause the one or more processors of the HAP to interact with another node of the network. For example, interacting with another node of the network may include pointing the one or more transceivers of the HAP towards another node of the network, establishing one or more links with at least one other node of the network, or routing data to another node of the network according to a routing path. To establish a backhaul link between terrestrial tower 110 and HAP 114, instructions may be sent to HAP 114 to cause the one or more processors 210 to control the one or more transceivers 220 to point towards terrestrial tower 112 and establish a link with terrestrial tower 112. In some implementations, the one or more processors of the terrestrial node may establish an integrated access and backhaul link.

To maintain the additional access link and/or backhaul link, the one or more processors of the HAP may control a flight of the HAP to be within range of the terrestrial tower, and the one or more processors of the terrestrial tower may control the one or more transceivers to track the flight of the HAP. Additionally or alternatively, a second HAP may be flown or otherwise directed to the location in range of the terrestrial tower after the HAP leaves the location to reestablish the additional access link and/or backhaul link. The process described in relation to flow diagram 400 may be repeated for the second HAP to establish the additional access link and/or backhaul link using the second HAP. In another example, the data for the HAP and the additional access link and/or backhaul link may be transferred to the second HAP, and the transferred data may be used to establish the additional access link and/or backhaul link using the second HAP. The additional access link and/or backhaul link using the original HAP may be removed either before, after, or simultaneous with establishing the additional access link and/or backhaul link with the second HAP.

In some alternatives, the one or more processors of the HAP, one or more processors of a central server, a network controller, or one or more other remote processors may be used to perform one or more of the steps in place of the one or more processors of the terrestrial node. The method may be performed using distributed self-organizing networking methods, centralized self-organizing networking methods, or hybrid self-organizing networking methods.

In one example, the one or more processors of the HAP 114 may determine that the HAP 114 can be used to provide an additional access link and/or an additional backhaul link in the network based on the location information of the HAP 114 and the known locations of terrestrial nodes of the network at block 404. The one or more processors of the HAP 114 may then initiate establishing the additional access link and/or the additional backhaul link by controlling the one or more transceivers of the HAP 114 to transmit signals toward the terrestrial node and/or sending a message to the terrestrial node to cause the one or more processors of the terrestrial node to control the one or more transceivers to transmit signals toward the HAP 114 at block 406.

In another example, the location information of the HAP 114 may be transmitted to the central server, the network controller, or another remote processor at block 402, and the central server, the network controller, or the other remote processor may perform determining that the HAP 114 can be used to provide an additional access link and/or an additional backhaul link in the network at block 404. Instructions may then be sent from the network controller or the remote processor to control the one or more transceivers of the terrestrial node and/or the HAP 114 to transmit signals toward the other at block 406, and to cause the establishing of the additional access link and/or the additional backhaul link at block 408.

Other combinations of which processors perform each of the steps in FIG. 4 may be used in different implementations.

Figure 5:
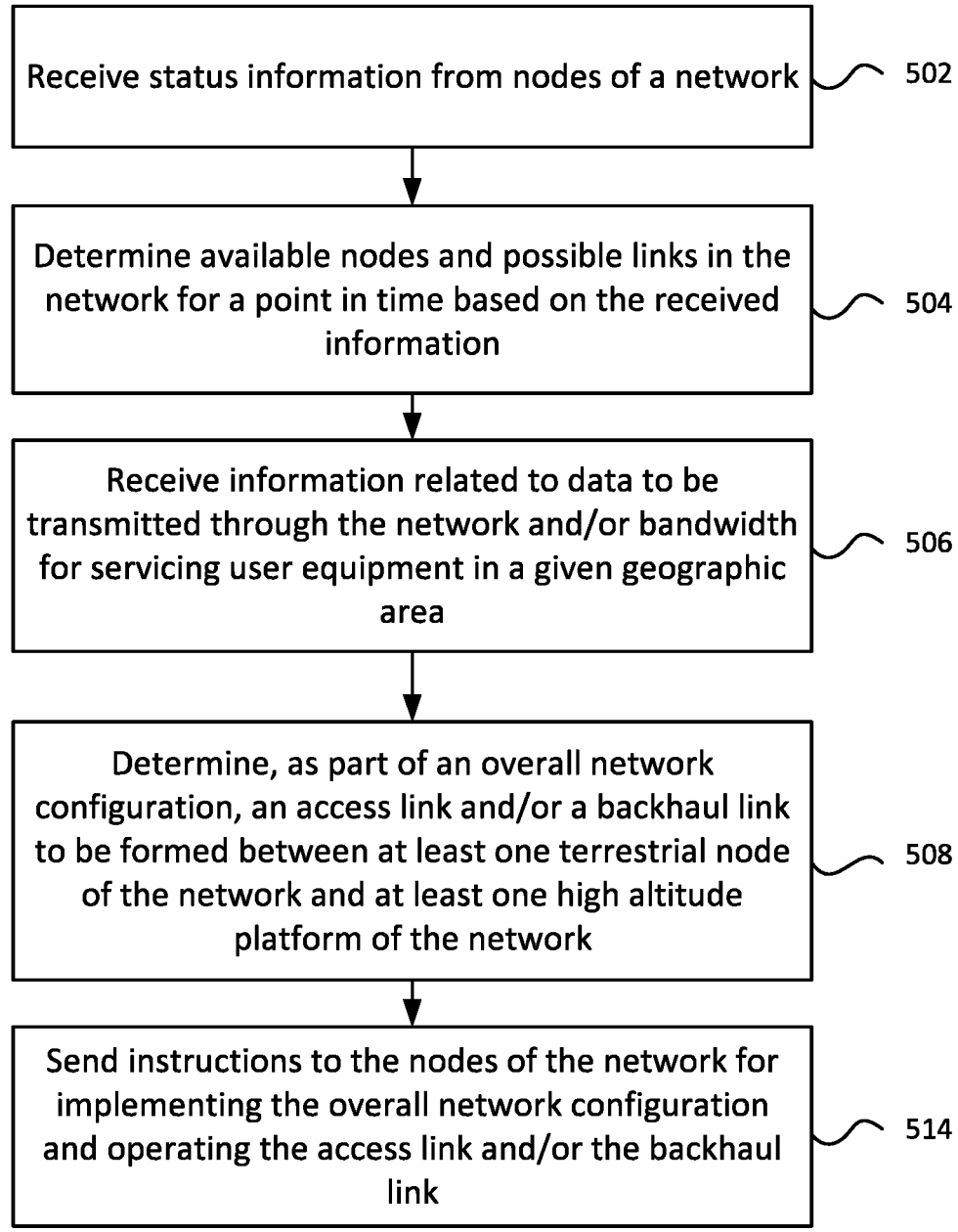
FIG. 5 is a flow diagram of another method in accordance with aspects of the disclosure.

Alternatively, a network controller may implement software-defined networking methods or self-organizing network technology to establish access and/or backhaul links in the network including terrestrial nodes and HAPs. In FIG. 5, flow diagram 500 is shown in accordance with some of the aspects described above that may be performed by the one or more processors 310 of the network controller 300. While FIG. 5 shows blocks in a particular order, the order may be varied and that multiple operations may be performed simultaneously. Also, operations may be added or omitted.

Figure 6:
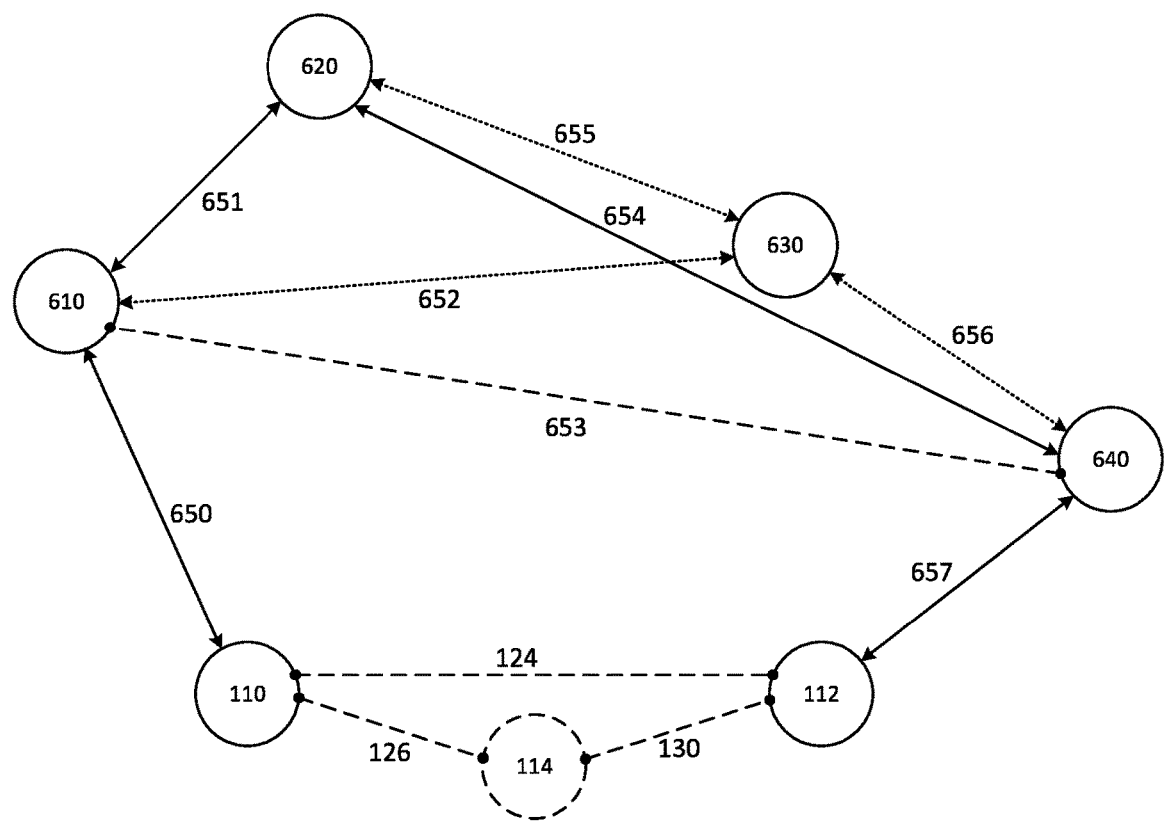
FIG. 6 is a diagram of an example network topology in accordance with aspects of the disclosure.
Figure 7:
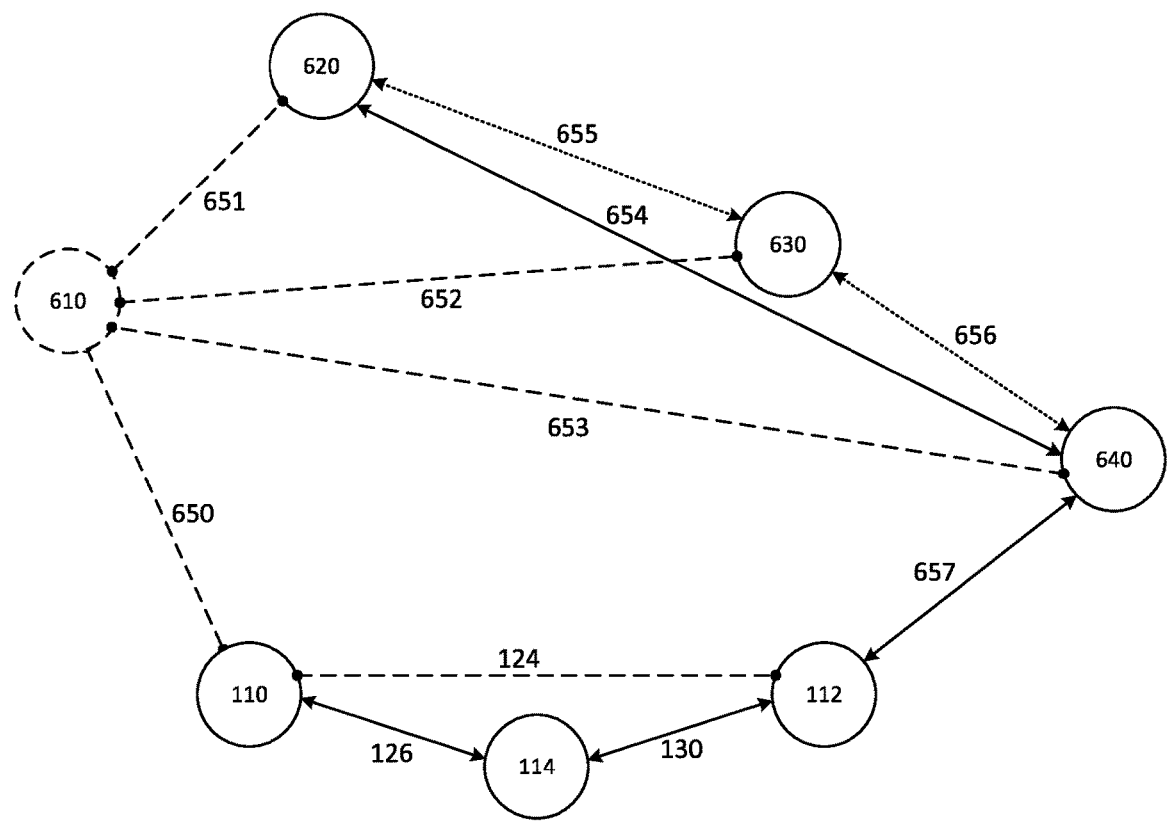
FIG. 7 is a diagram of another example network topology in accordance with aspects of the disclosure.

At block 502, the one or more processors 310 of the network controller 300 receive status information from each of the nodes within the network. Information may be related to the current or predicted condition of the nodes, weather, or links at a current time or a future time. The current or predicted condition of the nodes may include a coverage area for a given node and bandwidth provided to the coverage area by the given node. For example, as shown in FIGS. 6 and 7, the network may include as nodes additional terrestrial towers 610, 620, 630, and 640, in addition to terrestrial towers 110, 112 and HAP 114. Arrows shown between a pair of nodes represent possible communication paths between the nodes. In addition to paths 124, 126, and 130 corresponding to the paths shown in FIG. 1, paths 650-657 are shown between the nodes. The network as shown in FIG. 6 is illustrative only, and in some implementations the network may include additional or different nodes. The status information received from the nodes of the network may include the location information of HAP 114 or weather conditions at locations of terrestrial towers 110, 112, 610, 620, 630, and 640 at a current time or a future time. The location information of HAP 114 may include a projected trajectory or set location, such as a future location at the future time that is in signal range of the terrestrial towers 110, 112.

At block 504, the one or more processors 310 determine available nodes and possible links in the network at a current time or a future time based on the received information. A current topology of the network may include the available nodes and possible links at the current time, and a future topology of the network may include the available nodes and possible links at the future time. As shown in FIG. 6, available nodes in the network at the current time may be determined to include terrestrial towers 110, 112, 610, 620, 630, and 640. As shown by the arrows in the current topology 600, links 650-652 and 654-657 are included in the current topology. HAP 114 may not be available in the current topology because a current location of the HAP 114 is out of signal range of the terrestrial towers 110, 112. Also not available in the current topology are a first link along path 124 between terrestrial tower 110 and terrestrial tower 112, the second link along path 126 between terrestrial tower 110 and HAP 114, the third link along path 130 between HAP 114 and terrestrial tower 112, and the link 653 between terrestrial towers 610 and 640 (shown as a dash-dot line without arrows in FIG. 6). The first link may be unavailable due to the building 142 blocking a signal between the terrestrial towers 110 and 112; the second and third links may be unavailable due to the current location of HAP 114; and the link 653 may be unavailable due to a distance between terrestrial towers 610 and 640. Each possible link 650-652 and 654-657 in the current topology may also be labeled with link metrics, such as bandwidth, that are determined based on the received information. In the diagram of the current topology 600, solid lines indicate that links 650, 651, 654, 657 are capable of higher bandwidths, such as 3 Mbps or more, and dashed lines indicate that links 652, 655, 656 are capable of lower bandwidths, such as less than 3 Mbps.

As shown in FIG. 7, available nodes in the network at the future time may include terrestrial towers 110, 112, 620, 630, and 640, as well as the HAP 114 at the future location, which is in signal range of the terrestrial towers 110, 112. With the HAP 114 being available, possible links may be determined for the future time to include the second link along path 126 between terrestrial tower 110 and HAP 114 and the third link along path 130 between HAP 114 and terrestrial tower 112. Not available in the future topology 700 may be terrestrial tower 610, which may be due to weather conditions at the location of the terrestrial tower 610 including a thunderstorm at the future time. With terrestrial tower 610 being unavailable, links 650-653 between terrestrial tower 610 and other terrestrial towers 110, 620, 630, 640, respectively, may be unavailable at the future time (shown as a dash-dot line without arrows in FIG. 7).

At block 506, the one or more processors 310 receive information related to data to be transmitted through network and/or bandwidth for servicing user equipment in given geographic areas. The data information and the bandwidth information may be received from nodes or client devices in direct communication with the network controller 300 or may be received through existing links in the network. In some implementations, the data information and the bandwidth information may be predicted by the one or more processors 310 of the network controller 300 or by a remote system based on past data transmitted or past bandwidth usage. The data information may include an amount of data, a source location, and a destination location, or a requested time of transmission. In some cases, the data information also includes transmission requirements, such as bandwidth, class of service, quality of service, etc.

At block 508, the one or more processors 310 determine an overall network configuration that includes an access link and/or a backhaul link to be formed between available nodes of the network. For example, the access link and/or the backhaul link to be formed may be between at least one terrestrial node of the network and at least one HAP of the network when the at least one HAP is in signal range of the at least one terrestrial node. Determining the overall network configuration may include determining one or more flows for a current or future time using the current or future topology and the data information and selecting one or more links from the possible links between available nodes to form in a network configuration based on the one or more flows. The one or more flows may include estimated bandwidth needed between nodes of the network to satisfy needs of the data information. The access link may be included in the selected one or more links when the one or more processors 310 determine that a HAP can provide coverage to a geographic location that has an amount of coverage by the network that is lower than a threshold amount of coverage. The backhaul link may be included in the selected one or more links when the one or more processors 310 determine that a HAP can provide a link between two terrestrial nodes of the network. For example, the future location of the HAP 114 may be determined to provide coverage to a geographic location between buildings 140, 142 and a link between terrestrial towers 110, 112. As a result, the one or more processors 310 may determine an overall network configuration for the future time that includes an access link and a backhaul link to be formed between terrestrial towers 110, 112 and HAP 114. The access link and the backhaul link may be an integrated access and backhaul link.

At block 510, the one or more processors 310 send instructions to the nodes the network for implementing the overall network configuration and operating the access link and/or the backhaul link. The implementation instructions may be sent to the nodes at a current time or at a point in time before an implementation time. For the access link and/or the backhaul link between nodes 110, 112, 114, the implementation instructions may include instructions to establish a first link between the terrestrial tower 110 and the HAP 114 by controlling the one or more transceivers of the terrestrial tower 110 and the HAP 114 to transmit signals toward one another and to establish a second link between the HAP 114 and the terrestrial tower 112 by controlling the one or more transceivers of the HAP 114 and the terrestrial tower 112 to transmit signals toward one another. Controlling the one or more transceivers to transmit signals in a particular direction may include electronic beamforming and/or mechanically steering directional antennas. In some examples, the implementation instructions may include instructions regarding one or more protocols for the access link and/or backhaul link, such as a user plane layer protocol and a control layer protocol, respectively. The one or more protocols may be specific to millimeter wave communications or other high frequency communications, such as 5G NR protocols.

The features described herein provide for a network that is able to adapt to coverage and backhaul needs in an efficient manner. The incorporation of HAPs to provide additional access links and backhaul links may increase the capacity of the network that may otherwise be limited by the shorter range of higher frequency communication signals. The network may as a result provide more reliable service and better coverage to user equipment.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of establishing one or more links for an integrated access and backhaul for a network, the network including a high-altitude platform (HAP) node and a terrestrial node, the method comprising:
   determining, by one or more processors of the HAP node, that the HAP node can be used to provide at least one of an additional access link or an additional backhaul link in the network in connection with the terrestrial node, wherein the one or more processors of the HAP node are configured to operate according to a given protocol architecture including a control plane layer and a user plane layer;
   in response to the determining, controlling, by the one or more processors of the HAP node, one or more transceivers of the terrestrial node to transmit signals toward the HAP node according to physical location information of the HAP node, the signals including instructions for implementing at least one protocol associated with at least one of the control plane layer or the user plane layer;
   receiving, by the one or more processors of the HAP node, the signals; and
   in response to the receiving, establishing, by the one or more processors of the HAP node, the at least one of the additional access link or the additional backhaul link between the HAP node and the terrestrial node by implementing the at least one protocol.

2. The method of claim 1, further comprising:
   transmitting, by the one or more processors of the HAP node, the physical location information of the HAP to the terrestrial node,
   wherein the physical location information of the HAP node includes coordinates of a location of the HAP node.

3. The method of claim 1, wherein the HAP node is in signal range of the terrestrial node.

4. The method of claim 3, wherein the HAP node is also in range of a geographic location that has an amount of coverage by the network that is lower than a threshold amount of coverage.

5. The method of claim 3, wherein determining the HAP node is also in signal range of another terrestrial node in the network.

6. The method of claim 1, wherein the one or more transceivers of the terrestrial node point transmit signals above a horizon to a location of the HAP node.

7. The method of claim 1, wherein the additional access link is established by implementing a 5G New Radio (NR) protocol associated with the user plane layer at the HAP node and the terrestrial node.

8. The method of claim 1, wherein the additional backhaul link is established by implementing a 5G New Radio (NR) protocol associated with the control plane layer at the HAP node and the terrestrial node.

9. The method of claim 1, wherein the determining includes using software-defined networking to determine an overall network configuration for the network that includes the at least one of the additional access link or the additional backhaul link.

10. A non-transitory, computer-readable medium including instructions that, when executed by one or more processors of a high-altitude platform (HAP) node, cause the one or more processors to perform a method, the method comprising:
    determining that the HAP node can be used to provide at least one of an additional access link or an additional backhaul link in a network in connection with a terrestrial node of the network, wherein the one or more processors of the HAP node are configured to operate according to a given protocol architecture including a control plane layer and a user plane layer;
    in response to the determining, causing one or more transceivers of the terrestrial node to transmit signals toward the HAP node according to physical location information of the HAP node, the signals including instructions for implementing at least one protocol associated with at least one of the control plane layer or the user plane layer;
    receiving the signals; and
    in response to the receiving, causing the at least one of the additional access link or the additional backhaul link to be established between the HAP node and the terrestrial node by implementing the at least one protocol.

11. The medium of claim 10, further comprising:
    transmitting the physical location information of the HAP node to the terrestrial node,
    wherein the physical location information of the HAP node includes coordinates of a location of the HAP node.

12. The medium of claim 10, wherein the HAP node is in signal range of the terrestrial node.

13. The medium of claim 12, wherein he HAP node is also in range of a geographic location that has an amount of coverage by the network that is lower than a threshold amount of coverage.

14. The medium of claim 12, wherein the HAP node is also in signal range of another terrestrial node in the network.

15. The medium of claim 10, wherein the determining includes using software-defined networking to determine an overall network configuration for the network that includes the additional access link or the additional backhaul link.

16. A high-altitude platform (HAP) node comprising:
    one or more transceivers; and
    one or more processors of the HAP node, wherein the one or more processors are configured to:
      make a determination that the HAP node can be used to provide at least one of an additional access link or an additional backhaul link in a network including the HAP node and a terrestrial node, wherein the one or more processors of the HAP node are configured to operate according to a given protocol architecture including a control plane layer and a user plane layer;
      in response to the determination, control one or more transceivers of the terrestrial node to transmit signals toward the HAP node according to physical location information of the HAP node, the signals including instructions for implementing at least one protocol associated with at least one of the control plane layer or the user plane layer;
      receive the signals; and
      in response to received signals, establish the at least one of the additional access link or the additional backhaul link between the HAP node and the terrestrial node by implementing the at least one protocol.

17. The HAP node of claim 16, wherein the one or more processors are further configured to:
    in response to the determination, control one or more transceivers of the HAP node to transmit signals toward the terrestrial node.

18. The method of claim 1, wherein, in response to the determining, the one or more processors further control one or more transceivers of the HAP node to transmit signals toward the terrestrial node.

19. The medium of claim 12, wherein, in response to the determining, the one or more processors further control one or more transceivers of the HAP node to transmit signals toward the terrestrial node.

20. The method of claim 1, wherein the establishing the at least one of the additional access link or the additional backhaul link between the HAP node and the terrestrial node includes establishing the additional access link or the additional backhaul link as part of an integrated access and backhaul link.

21. The HAP node of claim 16,
 wherein the one or more processors of the HAP node are further configured to transmit the physical location information of the HAP node to the terrestrial node,
 wherein the physical location information of the HAP node includes coordinates of a location of the HAP node.

22. The HAP node of claim 16, wherein the one or more transceivers transmit signals above a horizon to a location of the HAP node.

23. The HAP node of claim 16, wherein the additional access link is established by implementing a 5G New Radio (NR) protocol associated with the user plane layer at the HAP node and the terrestrial node.

24. The HAP node of claim 16, wherein the additional backhaul link is established by implementing a 5G New Radio (NR) protocol associated with the control plane layer at the HAP and the terrestrial node.

* * * * *